(12) United States Patent
Eisenwinter et al.

(10) Patent No.: US 11,945,108 B2
(45) Date of Patent: Apr. 2, 2024

(54) ROBOT JOINT WITH LUBRICANT RESERVOIR

(71) Applicant: KUKA Deutschland GmbH, Augsburg (DE)

(72) Inventors: Leander Eisenwinter, Buttenwiesen (DE); Benjamin Kuhl, Augsburg (DE); Valentina Antonovsky, Augsburg (DE); Rainer Krumbacher, Retenbach (DE)

(73) Assignee: KUKA Deutschland GmbH (DE)

(*) Notice: Subject to any disclaimer, the term of this patent is extended or adjusted under 35 U.S.C. 154(b) by 38 days.

(21) Appl. No.: 17/623,643

(22) PCT Filed: Jun. 23, 2020

(86) PCT No.: PCT/EP2020/067439
§ 371 (c)(1),
(2) Date: Dec. 29, 2021

(87) PCT Pub. No.: WO2021/004774
PCT Pub. Date: Jan. 14, 2021

(65) Prior Publication Data
US 2022/0250235 A1    Aug. 11, 2022

(30) Foreign Application Priority Data
Jul. 9, 2019   (DE) .............. 10 2019 210 071.6

(51) Int. Cl.
*B25J 9/00*       (2006.01)
*B25J 19/00*      (2006.01)
(52) U.S. Cl.
CPC ......... *B25J 9/0009* (2013.01); *B25J 19/0062* (2013.01)

(58) Field of Classification Search
CPC . B25J 9/0009; B25J 19/0062; F16H 57/0402; F16H 57/0408; F16H 57/045; F16H 57/0493
See application file for complete search history.

(56) References Cited

U.S. PATENT DOCUMENTS

2005/0133305 A1* 6/2005 Okada .................. F16N 31/00
                                                    184/65
2013/0250303 A1* 9/2013 Shirata ................ B25J 13/087
                                                    356/436
(Continued)

FOREIGN PATENT DOCUMENTS

EP    2848917 A1    3/2015
EP    2851675 A1    3/2015
(Continued)

OTHER PUBLICATIONS

European Patent Office; Search Report in related International Patent Application No. PCT/EP2020/067439 dated Sep. 14, 2020; 3 pages.

(Continued)

Primary Examiner — Joseph Brown
(74) Attorney, Agent, or Firm — Dorton & Willis, LLP (57) ABSTRACT

A robot arm includes a first structural component, in particular a main frame for fixing the robot arm in its surroundings, a second structural component, in particular a carousel, which is mounted rotatably about an axis of rotation on the first structural component and a transmission for twisting the second structural component relative to the first structural component. The transmission includes a transmission casing and, a casing of the first structural component has at least one integrated cavity for receiving lubricant for the transmission. The cavity is fluidically connected to the transmis- (Continued)

sion casing by at least one connecting duct in the casing of the first structural component.

18 Claims, 2 Drawing Sheets

(56) References Cited

U.S. PATENT DOCUMENTS

| | | | |
|---|---|---|---|
| 2017/0028567 A1* | 2/2017 | Kojima | B25J 19/0062 |
| 2017/0312924 A1* | 11/2017 | Kinoshita | B25J 15/0009 |
| 2019/0054614 A1 | 2/2019 | Ohtsubo et al. | |
| 2019/0195333 A1 | 6/2019 | Uemura et al. | |
| 2019/0264795 A1* | 8/2019 | Nakayama | F16N 31/02 |

FOREIGN PATENT DOCUMENTS

| | | |
|---|---|---|
| EP | 3 444 082 A1 | 2/2019 |
| JP | 2007-232 003 A | 9/2007 |
| JP | 2019034383 A | 3/2019 |
| SE | 443941 B | 3/1986 |
| WO | 2004/007 152 A1 | 1/2004 |

OTHER PUBLICATIONS

German Patent Office; Search Report in related German Patent Application No. 10 2019 071.6 dated Mar. 5, 2020; 4 pages.
Chinese Patent Office; Office Action in related Chinese Patent Application No. 2020800500947 dated Jul. 29, 2023; 6 pages.

* cited by examiner

ROBOT JOINT WITH LUBRICANT RESERVOIR

CROSS-REFERENCE TO RELATED APPLICATIONS

This application is a national phase application under 35 U.S.C. § 371 of International Patent Application No. PCT/EP2020/067439, filed Jun. 23, 2020 (pending), which claims the benefit of priority to German Patent Application No. DE 10 2019 210 071.6, filed Jul. 9, 2019, the disclosures of which are incorporated by reference herein in their entirety.

TECHNICAL FIELD

The present invention relates to a robot arm, a method of installing the robot arm, and a robot arm arrangement with the robot arm.

BACKGROUND

Robot arms generally have a plurality of structural components that are mounted on one another in pairs so that in each case they can rotate about an axis of rotation.

SUMMARY

One object of an embodiment of the present invention is to improve at least one robot arm or its installation.

This object is achieved by a robot arm, a robot arm arrangement having at least one robot arm, or a method for installing at least one robot arm as described herein.

According to one embodiment of the present invention, a robot arm has a structural component, which in the present case is referred to as the first structural component without limiting general applicability, and a structural component which is mounted rotatably about an axis of rotation on the first structural component and which in the present case is referred to as the second structural component without limiting general applicability.

In one embodiment, the robot arm has at least one further structural component which is mounted rotatably about a further axis of rotation on the first or second structural component and on which, in one embodiment, at least one further structural component is in turn mounted rotatably about a further axis of rotation. In one embodiment, if the robot arm has at least three, in particular at least four, in one embodiment at least six, in a refinement at least seven, axes of rotation, one of which in one embodiment is the axis of rotation about which the second structural component is mounted rotatably on the first structural component, it can in particular be an articulated arm robot (arm). The present invention is particularly suitable for such robot arms, in particular because of its kinematics and/or conditions of use, without being restricted thereto.

In one embodiment, the first structural component is a main frame with which the robot arm is or will be fixed in its surroundings, or which is provided, in particular set up or used, for this purpose. In one embodiment, the second structural component is a carousel. The axis of rotation can thus in particular be a base axis of the robot arm. In a refinement, the main frame is or will be fixed in a stationary or mobile manner in its surroundings, in particular attached to a positioning device, in particular an additional axis, a mobile base or the like, or which is provided, in particular set up or used, for this purpose.

The present invention is particularly suitable for this, in particular because of the fastening, loads and/or dimensions, but without being limited thereto.

According to one embodiment of the present invention, the robot arm has a transmission by or via which the second structural component can be twisted relative to the first structural component about the axis of rotation, and in one embodiment is connected for this purpose to the first and/or second structural component, in particular in a non-destructively detachable manner. In one embodiment, the transmission has at least one gear wheel, in particular at least one planetary stage. The present invention is particularly suitable for this, in particular due to the loads, tooth engagements and/or dimensions, but without being restricted thereto.

According to one embodiment of the present invention, the transmission has a one-part or multi-part transmission casing. In one embodiment, the transmission has at least one input, in particular an input shaft, and at least one output, in particular an output shaft, which in a refinement is parallel thereto, in particular in alignment therewith. In a refinement, the input is coupled to a drive, which in one embodiment is fastened to the second structural component, in one embodiment via at least one gear stage. In one embodiment, the drive can comprise, in particular it can be, an electric motor. Additionally or alternatively, in one embodiment the transmission casing is fixed to the second structural component and/or the output is fixed to the first structural component, in particular in a non-destructively detachable manner. Additionally or alternatively, in one embodiment the transmission casing is partially or completely filled with lubricant, in particular (lubricating or gear) oil, or is provided, in particular set up or used, for this purpose. The present invention is particularly suitable for this, in particular due to the loads, tooth engagements and/or dimensions, but without being restricted thereto.

According to one embodiment of the present invention, a one-part or multi-part casing of the first structural component, which is also referred to below as the (first) structural component casing, has at least one integrated cavity which (in at least one orientation or setup of the robot arm) holds lubricant for and/or from the transmission, or is provided, in particular set up or used, for this purpose, and is in fluidic communication or is fluidically connected to or communicates with the transmission casing via at least one connecting duct in the structural component casing. In one embodiment, this cavity (in the direction of the axis of rotation or axially) is arranged wholly or partially below the transmission casing and/or output if the second structural component is arranged above the first structural component ("floor installation" or "floor setup") and/or is arranged entirely or partially above the transmission casing and/or output if the second structural component is arranged below the first structural component ("ceiling installation" or "ceiling setup").

As a result, in one embodiment (in at least one orientation or setup of the robot arm) a lubricant compensation reservoir is made available which can advantageously compensate for, in particular, thermally induced volume changes of a gear lubricant supply or a gear lubricant filling. Correspondingly, in one embodiment the cavity is or forms a lubricant compensation reservoir or a lubricant compensation container integrated into (the structural component casing).

By integrating it into the casing of the first structural component, i.e. in one embodiment a main frame casing, in one embodiment components such as separate expansion tanks, fittings, hoses, fastenings and the like can advantageously be saved and, therefore, in particular mobility and/or safety of the robot arm and/or its installation can be improved.

In one embodiment, one or more walls delimiting the cavity (of the structural component casing in each case) have or form an outer side or surface of the first structural component. In a refinement, a wall (of the structural component casing) delimiting the cavity has or forms a side or (with respect to the axis of rotation) lateral outer side of the first structural component and/or a wall (in particular a different one, in one embodiment a wall adjoining it) delimiting the cavity, an end face of the first structural component which is axial with respect to the axis of rotation, in one embodiment a (different) wall, an axial end face facing the second structural component and/or a ((possibly further) different) wall, an axial end face facing away from the second structural component, in particular a base or mounting surface.

As a result, in one embodiment passive cooling can be implemented or improved by exchanging heat with the surroundings via this/these outer side (s).

In one embodiment, the cavity has at least one opening to a, in particular (one of) the, outer side(s) of the first structural component, in particular the structural component casing, with a closure which, in one embodiment, at least temporarily closes this opening, in particular seals it against leakage of lubricant, or is provided, in particular set up or used, for this purpose.

In this way, in one embodiment filling and/or draining of lubricant, in particular a lubricant change, and/or checking of a lubricant level or state can be improved.

In one embodiment, the cavity has a through-hole to an outer side of the first structural component (casing), which in the present case is referred to as the first through-hole, without limiting general applicability, with a closure which at least temporarily closes this through-hole against the leakage of lubricant, in particular seals it, or is provided, in particular set up or used, for this purpose.

In a refinement, the first through hole or its longitudinal or hole axis is (oriented) transversely to the axis of rotation, forms with it in particular an angle of at least 30 degrees, in particular at least 45 degrees, and/or this outer side of the first structural component is a side or, with respect to the axis of rotation, lateral outer side of the first structural component (casing). In this way, access can be made easier in one embodiment. In a further refinement, the first through hole or its longitudinal or hole axis is (oriented) axially to the axis of rotation, forms with it in particular an angle of at most 25 degrees, in particular at most 15 degrees, and/or this outer side of the first structural component is an axial outer or end face of the first structural component (casing) relative to the axis of rotation. In this way, an inflow or outflow can be made easier in one embodiment.

In a refinement, the closure of (for closing) the first through hole has a screw (screw plug), in particular it can be one.

In one embodiment, this can improve the filling and/or draining of lubricant, in particular a lubricant change, a check of a lubricant level or state and/or a venting.

Additionally or alternatively, in one embodiment the cavity has at least one cleaning opening to an outer side of the first structural component (casing) with a closure which closes this cleaning opening, in particular seals it, at least temporarily against the leakage of lubricant, or is provided, in particular set up or used, for this purpose.

In a refinement, the cleaning opening, in particular its minimum and/or maximum clear width or its minimum and/or maximum diameter, is larger than the first through hole, in particular its minimum and/or maximum clear width or minimum and/or maximum diameter, in one embodiment by at least 10 percent, in particular at least 50 percent.

In this way, in one embodiment cleaning and/or inspection of the cavity can be improved. In one embodiment, the cleaning opening for this purpose has an area of at least 20 $cm^2$, in particular at least 80 $cm^2$.

Additionally or alternatively, the cleaning opening or its longitudinal or passage axis is in a refinement (oriented) axially to the axis of rotation and forms with it in particular an angle of at most 25 degrees, in particular at most 15 degrees.

Additionally or alternatively, in a refinement the cleaning opening is arranged in a basal area of the first structural component (casing) facing away from the second structural component.

In this way, an inflow or outflow can be made easier in one embodiment.

In a refinement, the cleaning opening or its longitudinal or bore axis is (oriented) transversely to the axis of rotation, forms with it in particular an angle of at least 30 degrees, in particular at least 45 degrees, and/or this outer side of the first structural component is a side or, with respect to the axis of rotation, lateral outer side of the first structural component (casing). In this way, access can be made easier in one embodiment.

Additionally or alternatively, in a refinement, the first through-hole and the cleaning opening are openings to different, in one embodiment mutually adjoining, outer sides.

In this way, in one embodiment filling and/or draining of lubricant, in particular a lubricant change, checking of a lubricant level or state, venting and/or cleaning and/or inspection of the cavity can be improved.

Additionally or alternatively, in a refinement, the closure of this cleaning opening has a (closure) cover which, in one embodiment, is or will be frictionally fastened to, in particular in, the cleaning opening or is provided, in particular set up or used, for this purpose. In one embodiment, the (closure) cover has an at least partially rubberized outer surface for this purpose. Additionally or alternatively, in one embodiment the (closure) cover is or will be secured, in particular in a positive-locking manner, in one embodiment by at least one snap ring, on the casing of the first structural component and/or has a metal and/or plastics core.

In this way, in one embodiment cleaning and/or inspection of the cavity can be improved.

In one embodiment, the first through-hole is arranged (as seen) in the direction of the axis of rotation between the cleaning opening and the second structural component, in particular in a half of the cavity that is closer to the cleaning opening, in particular a quarter of the cavity that is closest to the cleaning opening.

In this way, in one embodiment a discharge of lubricant, in particular a lubricant change, a check of a lubricant level or state and/or a venting can be improved.

In one embodiment, the second structural component has at least one second through-hole to an outer side of the second structural component with a closure for closing the second through-hole, in particular at a distance from the cavity in the direction of the axis of rotation.

In a refinement, the second through hole or its longitudinal or hole axis is (oriented) transversely to the axis of rotation, forms with it in particular an angle of at least 30 degrees, in particular at least 45 degrees, and/or this outer side of the second structural component is a side or, with respect to the axis of rotation, lateral outer side of the second structural component. In this way, access can be made easier in one embodiment. In a further refinement, the second through hole or its longitudinal or hole axis is (oriented) axially to the axis of rotation, forms with it in particular an angle of at most 25 degrees, in particular at most 15 degrees, and/or this outer side of the second structural component is an axial outer or end face of the second structural component (casing) relative the axis of rotation. In this way, an inflow or outflow can be made easier in one embodiment.

In a refinement, the closure of (for closing) the second through hole has, in particular can be, a screw (screw plug). In one embodiment, this second through-hole and the cavity are arranged on opposite sides of the transmission casing (in the direction of the axis of rotation).

In this way, in one embodiment filling and/or draining of lubricant, in particular a lubricant change, check of a lubricant level or state and/or venting can be improved.

In one embodiment, at least one lubricant compartment, which communicates with the cavity (in fluidic communication or fluidically) and is delimited by the first structural component, the second structural component, a component, in particular a tube, that is connected thereto in a rotationally fixed manner and/or a transmission casing, is sealed off against the leakage of lubricant, in particular due to gravity, in the direction of a base surface of the first structural component that faces away from the second structural component and/or in the opposite direction thereto.

As a result, in one embodiment the robot arm can be installed on the floor and ceiling (on the floor) in a particularly advantageous manner, i.e. in particular the main frame can be fastened on the floor and ceiling.

In one embodiment, the robot arm, in particular for this purpose, has at least one, in particular radial and/or stationary, seal between the first structural component (casing) and an output of the transmission that is in particular connected thereto.

Additionally or alternatively, in one embodiment, in particular for this purpose, the robot arm has at least one seal, in particular a radial and/or shaft seal, between the transmission casing and an output of the transmission that is in particular connected to the first structural component (casing).

Additionally or alternatively, in one embodiment, in particular for this purpose, the robot arm has at least one seal, in particular a radial and/or shaft seal, between the first structural component (casing) and the second structural component or a component that is connected thereto in a rotationally fixed manner, in particular a (hollow) tube.

In one embodiment, the (hollow) tube can be provided, in particular set up, or used for the passage of lines or the like. In one embodiment, at least one seal is arranged between it and the second structural component.

Additionally or alternatively, in one embodiment the robot arm has at least one, in particular radial and/or stationary, seal between the transmission casing and the second structural component, in particular for the aforementioned seal against the leakage of lubricant in the direction of the basal area of the first structural component facing away from the second structural component, and/or in the opposite direction thereto.

Additionally or alternatively, in one embodiment, in particular for this purpose, the robot arm has at least one seal between the second structural component and a drive shaft, coupled to the transmission, of a drive for twisting the second structural component relative to the first structural component.

In one embodiment, the drive has at least one electric motor.

Additionally or alternatively, the robot arm in one embodiment has, in particular for the aforementioned sealing against the leakage of lubricant in the direction of the basal area of the first structural component facing away from the second structural component and/or in the opposite direction, (in each case) at least one seal between the one or more of the opening(s) of the cavity to an outer side of the first structural component (casing) and its closure.

In one embodiment, at least one magnet is arranged in the cavity, in a refinement on the cover for closing the cleaning opening.

In one embodiment, this allows dust from abrasion to be collected in the lubricant.

In one embodiment, at least one diaphragm accumulator is arranged in the cavity.

In this way, in one embodiment the amount or filling of lubricant can be reduced and/or pressure fluctuations can be better compensated for.

Additionally or alternatively, in one embodiment at least one lubricant temperature control device, in particular a lubricant heating (device) and/or lubricant cooling (device), is arranged in the cavity.

Additionally or alternatively, in one embodiment at least one lubricant regeneration device, at least one lubricant filter device and/or at least one lubricant circulation device, in particular a pump and/or lubricant bypass inlet and/or outlet opening, is arranged in the cavity.

As a result, in one embodiment the lubrication quality can be improved.

According to one embodiment of the present invention, the cavity (in at least one orientation or setup of the robot arm) is at least partially filled with lubricant, and/or the transmission casing (in at least one orientation or setup of the robot arm, in particular with floor and/or ceiling installation) is at least partially or filled with lubricant, wherein the lubricant, as explained above, can comprise, in particular can be (lubricating or gear) oil.

In one embodiment, when the first structural component is set up or installed on the floor, the cavity is completely filled with lubricant, wherein the lubricant level is in the transmission casing or above the transmission casing, in particular in the lubricant compartment, which communicates with the cavity and is delimited by the first structural component, the second structural component, a component that is connected thereto in a rotationally fixed manner, and/or transmission casing, and/or is at least at the level of an input or the input, in particular having a gear wheel coupled to the drive, of the transmission, wherein in one embodiment a volume of gas, in particular air, is present or remains above the lubricant level, in particular in the lubricant compartment communicating with the cavity and delimited by the first structural component, the second structural component, component that is connected thereto in a rotationally fixed manner and/or the transmission casing. Additionally or alternatively, in one embodiment the same amount of lubricant is provided or used when the first structural component is set up or installed on the ceiling and/or the lubricant level is in the transmission casing or above the transmission casing, in particular in the cavity or below the cavity.

As a result, in one embodiment thermally induced changes in volume of a gear lubricant supply or a gear lubricant filling in particular can advantageously be compensated for.

According to one embodiment of the present invention, the first robot arm or a first robot arm described here is or will be arranged with the second structural component above the first structural component; in one embodiment the first structural component is fastened at the bottom, in particular before, during or after the cavity is filled with lubricant ("floor installation").

Additionally or alternatively, according to one embodiment of the present invention, this (first) robot arm or a (further) robot arm of the same construction is or will be arranged with its second structural component below its first structural component; in one embodiment the first structural component is attached to the ceiling, in particular before, during or after the (re)filling or a (re)filling of its cavity with lubricant ("ceiling installation").

Additionally or alternatively, according to one embodiment of the present invention, this robot arm or a (further) robot arm of the same construction is or will be arranged with its second structural component to the side of its first structural component, in one embodiment the first structural component is attached to the wall, in particular before, during or after or (re) filling its cavity with lubricant.

Thus, according to one embodiment of the present invention, the same robot arm is optionally arranged or used with its second structural component above or below or in some cases to the side of its first structural component or its first structural component is fastened on the floor or ceiling or in some cases on the wall or is provided, in particular set up or used, for this purpose.

According to one embodiment of the present invention, a first robot arm described here is arranged or used with its second structural component above its first structural component, and a further robot arm of the same construction is arranged or used with its second structural component below its first structural component, or the first structural component of the first robot arm is attached to the floor and the first structural component of the further robot arm is attached to the ceiling, or the first and further robot arms or are provided, in particular set up or used, for this purpose. In one embodiment, the amount of lubricant of or for the transmission between the first and second structural component of one of these two robot arms and the amount of lubricant of or for the corresponding transmission between the (corresponding) first and second structural component of the other of these two robot arms or the amounts of lubricant quantities in the particular cavity and lubricant compartment communicating therewith of these two robot arms, in particular with an initial or factory filling, deviate by a maximum of 10 percent, in particular a maximum of 1 percent, or two structurally identical robot arms described here or their respective cavities and lubricant compartments communicating therewith are or will be filled with lubricant quantities of or for the corresponding transmission between the (corresponding) first and second structural components, in particular factory-filled or initially filled, which differ from one another by a maximum of 10 percent, in particular a maximum of 1 percent.

Advantageously, the same robot arm or robot arms of the same construction can therefore be arranged or fastened or used and/or (initially) filled with the same amount of lubricant without additional effort, whether floor mounted, ceiling mounted or, as may be required in some cases, wall-mounted.

In one embodiment, the cavity is or will be completely or partially coated, in particular painted.

As a result, in one embodiment the lubrication quality can be improved.

In one embodiment, the cavity is or will be initially formed, or cast, together with the casing of the first structural component. Additionally or alternatively, in one embodiment the (first) structural component casing, in particular the one or more walls of the cavity, have metal, are metal or in a refinement will be made thereof.

According to one embodiment of the present invention, a robot arm arrangement has a robot arm described here and one or more further robot arms, which (each) have a first structural component, in particular a main frame for fastening the further robot arm in its surroundings, a second structural component, in particular a carousel, which is mounted rotatably about an axis of rotation on this first structural component, and comprise(s) a transmission for twisting this second structural component relative to this first structural component, the transmission (in each case) comprising a transmission casing. In one embodiment, the one or more of the further robot arm(s) is (are) likewise (a) robot arm(s) described here.

According to one embodiment of the present invention, the transmission casing of the further robot arm or of one or more of the further robot arms, in particular the cavity of the further robot arm or of one or more of the further robot arms, is/are fluidically connected (in each case) to the cavity of the first robot arm connected, in one embodiment via one or more ducts and/or lines, in particular hoses.

In this way, in one embodiment a common equalizing lubricant volume can advantageously be implemented for two or more robot arms.

In one embodiment, one or more of the seals mentioned here each have at least one radial seal, in particular at least one radial shaft seal, at least one, in particular dynamic, O-ring or V-ring and/or at least one adhesive seal, in one embodiment, one or more of the seals mentioned here are glued.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
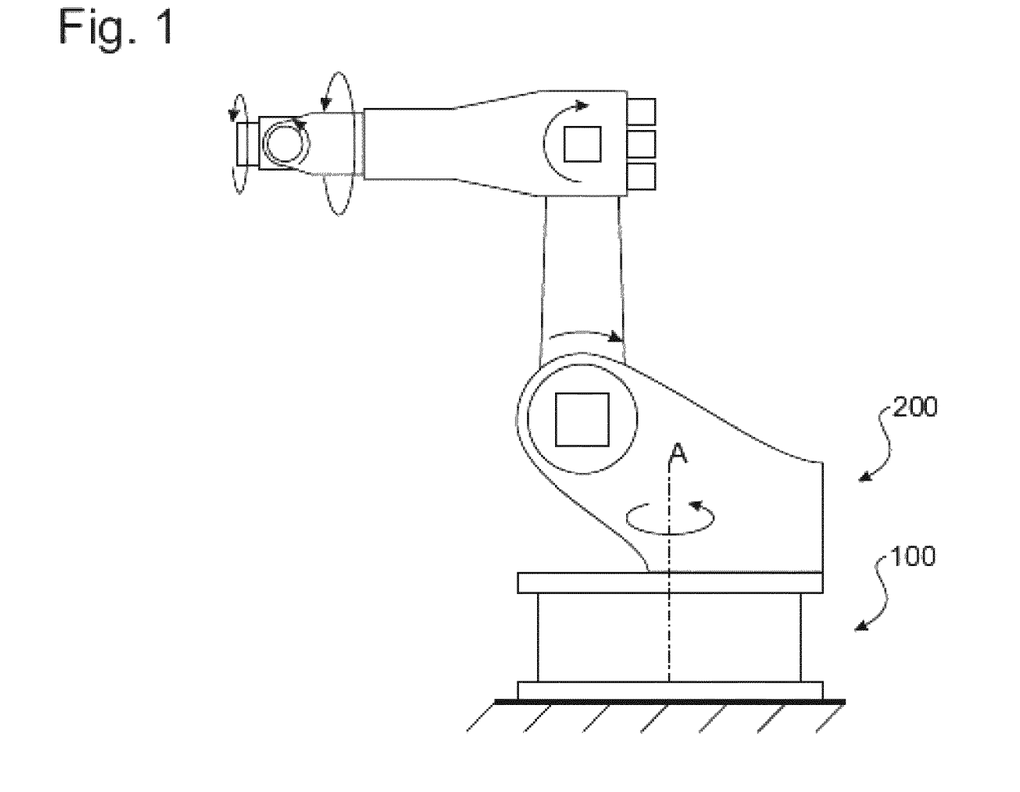
FIG. 1 schematically illustrates a robot arm according to one embodiment of the present invention.

FIG. 1 shows a six-axis robot arm according to one embodiment of the present invention with a main frame 100 and a carousel 200, which is mounted rotatably about a base axis A on the main frame 100.

Figure 2:
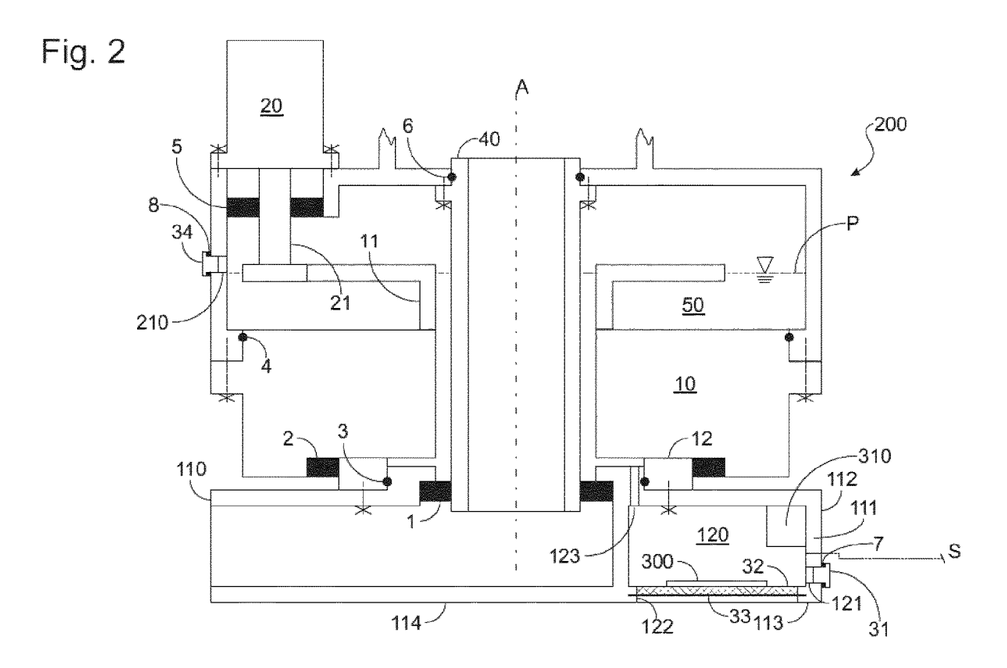
FIG. 2 schematically depicts a part of the robot arm in FIG. 1 in a simplified sectional view.

FIG. 2 shows a part of this robot arm, in particular its main frame 100 and carousel 200 (partially).

The main frame 100 has a casing 110 (of a (first) structural component casing) with an integrated cavity 120 formed in one embodiment during the casting of the casing 110.

A wall 111 of the cavity 120 forms a side or lateral outer side 112 of the main frame (casing), and a different wall 113 of the cavity 120 forms an axial end face 114 or a base or mounting surface facing away from the carousel.

To rotate the carousel 200 relative to the main frame 100 about the base axis A, a drive 20 is coupled via a pinion of its drive shaft 21 to a gear wheel of an input shaft 11 of a transmission, which comprises an output (shaft) 12 attached to the main frame (casing) and is indicated by its simplified or schematically illustrated transmission casing 10.

Drive 20 and transmission casing 10 are attached to carousel 200.

A hollow tube 40 is attached to the carousel 200.

A radial shaft seal, in one embodiment a radial shaft sealing ring 1, is arranged between the main frame (casing) and this hollow tube 40, which is connected in a rotationally fixed manner to the carousel 200. In a modification that is not shown, a dynamic O-ring or V-ring can in particular also be used.

A radial shaft seal, in one embodiment a radial shaft sealing ring 2, is arranged between the transmission casing 10 and the output 12 of the transmission, which is connected to the main frame (casing).

An O-ring (seal) 3 is arranged between the main frame (casing) and the output 12 of the transmission connected thereto.

An O-ring (seal) 4 is arranged between the transmission casing 10 and the carousel 200. In a modification that is not shown, one or more static sealing points can in particular be glued.

A radial shaft seal, in one embodiment a radial shaft sealing ring 5, is arranged between the carousel 200 and the drive shaft 21 of the drive 20 which is coupled to the transmission.

An O-ring (seal) 6 is arranged between the carousel 200 and the hollow tube 40 connected thereto.

The cavity 120 has a first through-hole 121 transverse to the base axis A to the lateral outer side 112 of the main frame (casing) with a screw plug 31.

A seal 7 is arranged between the first through-hole 121 and its screw plug 31.

The carousel 200 has a second through-hole 210, spaced apart from the cavity 120 in the direction of the base axis A, transverse to the base axis A for a lateral outer side of the carousel 200 with screw plug 34.

A seal 8 is arranged between the second through-hole 210 and its screw plug 34.

The cavity 120 has a cleaning opening 122 that is axial with respect to the base axis A for the axial end face 114 or base or mounting surface of the main frame (casing) with a closure cover 32 that is frictionally attached, rubberized for this purpose and thereby providing sealing, which is axially secured by a snap ring 33. The cleaning opening 122 is larger than the first through hole 121.

The cavity 120 is fluidically connected to the transmission casing 10 through a connecting duct 123 in the main frame (casing).

A lubricant compartment 50 is or will be delimited by the main frame (casing), carousel 200, hollow tube 40 and transmission casing 10, and in the floor installation shown in FIG. 2, in which the carousel 200 is arranged above the main frame 100, is or will be filled with lubricant up to a level P and communicates with the cavity 120 fluidically via the connecting duct 123. Correspondingly, in this orientation or installation of the robot arm shown in FIG. 1, 2, in which the carousel 200 is arranged above the main frame 100, the cavity 120 is completely filled with lubricant.

The lubricant compartment 50 is sealed by the seals 1-4 against the leakage of lubricant caused by gravity in the direction of the basal area 114 of the main frame 100 facing away from the second structural component.

If this robot arm will be or is installed in the opposite orientation, in which the carousel 200 is then arranged below the main frame 100, the lubricant compartment 50 is sealed off by the seals 4-6 and possibly 1, 2 and/or 3 against the leakage of lubricant caused by gravity in the direction that is remote from the basal area 114.

The cavity 120 integrated in the main frame (casing) acts as a lubricant reservoir or expansion (tank) when installed on the floor and ensures lubrication of the transmission if it is (factory) filled, even if it is installed on the ceiling, wherein the amount of lubricant remains the same or the same amount of lubricant is or will be filled or retained for floor and ceiling installation.

In addition, it improves passive cooling of the lubricant, in particular through the wall 111.

The through bores 121, 210 and the cleaning opening 122 improve filling and/or emptying of lubricant, inspection and/or cleaning.

A magnet 300 for collecting dust from abrasion from the lubricant is arranged on the closure cover 32.

In addition, a diaphragm accumulator, a lubricant temperature control device, a lubricant regeneration device, a lubricant filter device and/or a lubricant circulating device can be or will be arranged in the cavity 120 and are indicated in simplified form by an element 310 in FIG. 2.

Although embodiments have been explained in the preceding description, it is noted that a large number of modifications are possible.

For example, the cavity 120 can be or will be able to be fluidically connected to the transmission casing of a further robot arm (not shown), in particular fluidically connected to a cavity of a further robot arm described here (not shown), in particular via a hose connection S indicated by dashed lines.

It is also noted that the embodiments are merely examples that are not intended to restrict the scope of protection, the applications and the structure in any way. Rather, the preceding description provides a person skilled in the art with guidelines for implementing at least one embodiment, with various changes, in particular with regard to the function and arrangement of the described components, being able to be made without departing from the scope of protection as it arises from the claims and from these equivalent combinations of features.

While the present invention has been illustrated by a description of various embodiments, and while these embodiments have been described in considerable detail, it is not intended to restrict or in any way limit the scope of the appended claims to such de-tail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

REFERENCE SIGNS 1-8 Seal
10 Transmission casing
11 Transmission input (shaft)
12 Transmission output (shaft)
20 Drive (motor)
21 Drive shaft
31 Screw plug
32 Closure cover
33 Snap ring
34 Screw plug 40 Hollow tube
50 Lubricant compartment
100 Main frame (first structural component)
110 (First) structural component or main frame casing
111 Wall
112 Lateral outer side
113 Wall
114 Axial end face
120 Cavity
121 First through hole
122 Cleaning opening
123 Connecting duct
200 Carousel (second structural component)
210 Second through hole
300 Magnet
310 Diaphragm accumulator/Lubricant temperature control/regeneration/filter/circulation device
A. Base axis (axis of rotation)
P Lubricant level
S Hose connection

What is claimed is:

1. A robot arm, comprising:
a first structural component for fixing the robot arm in its surroundings;
a second structural component mounted rotatably about an axis of rotation on the first structural component; and
a transmission for rotating the second structural component relative to the first structural component;
wherein the transmission comprises a transmission casing;
the first structural component including a casing that comprises at least one integrated cavity for receiving lubricant for the transmission, the integrated cavity sized and configured to compensate for changes in fluid volume experienced by the transmission by adding or removing lubricant;
the at least one cavity fluidically connected to the transmission casing by at least one connecting conduit in the casing of the first structural component;
the at least one cavity comprising at least one opening to an outer side of the first structural component, and having a closure for closing the opening.

2. The robot arm of claim 1, wherein at least one of:
the first structural component is a base frame; or
the second structural component is a carousel.

3. The robot arm of claim 1, wherein the at least one cavity is delimited by at least one wall that comprises the outer side of the first structural component.

4. The robot arm of claim 1, wherein
the at least one cavity further comprises at least one cleaning opening to the outer side of the first structural component, and a closure designed for closing off the cleaning opening.

5. The robot arm of claim 4, wherein at least one of:
the closure comprises a screw for closing the at least one opening when the at least one opening is a first through hole;
the cleaning opening is larger than the first through hole;
the cleaning opening opens to a different outer side of the first structural component than the first through hole;
the cleaning opening faces away from the second structural component; or
the closure comprises a cover designed for closing off the cleaning opening.

6. The robot arm of claim 4, wherein at least one of:
the cleaning opening is arranged in a basal area of the first structural component that faces away from the second structural component;
the first through hole is arranged in the direction of the axis of rotation between the cleaning opening and the second structural component; or
the first through hole is arranged in a half of the cavity that is closer to the cleaning opening.

7. The robot arm of claim 1, wherein the second structural component comprises:
at least one second through hole to an outer side of the second structural component; and
a closure for closing off the second through hole.

8. The robot arm of claim 7, wherein at least one of:
the at least one second through hole is spaced apart from the at least one cavity in the direction of the axis of rotation;
the at least one second through hole is spaced apart from the at least one cavity transversally or axially with respect to the axis of rotation;
the closure for closing off the second through hole is a screw plug.

9. The robot arm of claim 1, further comprising:
at least one lubricant compartment communicating with the at least one cavity and delimited by at least one of the first structural component, the second structural component, a component that is connected in a rotationally fixed manner to the second structural component, or the transmission casing;
the at least one lubricant compartment being sealed against the leakage of lubricant in at least one of:
the direction of a basal area of the first structural component that faces away from the second structural component, or
a direction opposite the basal area of the first structural component.

10. The robot arm of claim 9, wherein the component that is connected in a rotationally fixed manner to the second structural component is a tube.

11. The robot arm of claim 1, further comprising at least one of:
at least one seal between the first structural component and an output of the transmission;
at least one seal between the transmission casing and an output of the transmission;
at least one seal between the first structural component and the second structural component;
at least one seal between the first structural component and a component that is connected to the second structural component in a rotationally fixed manner;
at least one seal between the transmission casing and the second structural component;
at least one seal between the second structural component and a drive shaft, coupled to the transmission, of a drive for twisting the second structural component relative to the first structural component; or
at least one seal between at least one opening of the at least one cavity to an outer side of the first structural component and the closure for the at least one opening.

12. The robot arm of claim 11, wherein at least one of:
the output of the transmission is connected to the first structural component; or
the component that is connected in a rotationally fixed manner to the second structural component is a tube.

13. The robot arm of claim 1, further comprising at least one magnet arranged in the at least one cavity.

14. The robot arm of claim 13, wherein:
the at least one cavity comprises at least one cleaning opening to the outer side of the first structural component, and having a cover designed for closing off the cleaning opening; and
the at least one magnet is arranged on the cover for closing off the cleaning opening.

15. The robot arm of claim 1, further comprising:
at least one diaphragm accumulator arranged in the at least one cavity;
at least one lubricant temperature control device arranged in the at least one cavity;
at least one lubricant regeneration device arranged in the at least one cavity;
at least one lubricant filter device arranged in the at least one cavity; or
at least one lubricant circulation device arranged in the at least one cavity.

16. The robot arm of claim 1, wherein at least one of:
the at least one cavity is at least partially coated; or
the at least one cavity is originally formed together with the casing of the first structural component.

17. The robot arm of claim 16, wherein at least one of:
the coating comprises paint; or
the at least one cavity is cast with the casing of the first structural component.

18. A method of manufacturing a robot arm, the method comprising:
obtaining a first structural component designed for fixing the robot arm in its surroundings;
coupling a second structural component to the first structural component for rotational movement relative to the first component about an axis of rotation;
coupling a transmission to at least one of the first or second components, the transmission operable to rotate the second structural component relative to the first structural component;
wherein the transmission comprises a transmission casing;
the first structural component including a casing that comprises at least one integrated cavity for receiving lubricant for the transmission, the integrated cavity sized and configured to compensate for changes in fluid volume experienced by the transmission by adding or removing lubricant;
the at least one cavity comprising at least one opening to an outer side of the first structural component, and having a closure for closing the opening; and
fluidically connecting the at least one cavity to the transmission casing by at least one connecting conduit in the casing of the first structural component.

* * * * *